(12) United States Patent
Meisenholder

(10) Patent No.: US 12,535,681 B2
(45) Date of Patent: Jan. 27, 2026

(54) CONTEXT-BASED IMAGE STATE SELECTION

(71) Applicant: David Meisenholder, Los Angeles, CA (US)

(72) Inventor: David Meisenholder, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/201,022

(22) Filed: May 23, 2023

(65) Prior Publication Data

US 2023/0288702 A1 Sep. 14, 2023

Related U.S. Application Data

(63) Continuation of application No. 16/824,250, filed on Mar. 19, 2020, now Pat. No. 11,686,940.

(51) Int. Cl.
*G02B 27/01* (2006.01)
*G06T 19/00* (2011.01)
*H04W 4/029* (2018.01)

(52) U.S. Cl.
CPC .......... *G02B 27/017* (2013.01); *G06T 19/006* (2013.01); *H04W 4/029* (2018.02); *G02B 2027/0178* (2013.01)

(58) Field of Classification Search
CPC .......... G02B 27/017; G02B 2027/0178; G02B 26/10; G02B 2027/0112; G02B 2027/0138; G02B 2027/014; G02B 2027/0145; G02B 27/0172; G06T 19/006; H04W 4/029
See application file for complete search history.

(56) References Cited

U.S. PATENT DOCUMENTS

| 9,734,402 B2 | 8/2017 | Jang et al. |
| 10,180,769 B1 | 1/2019 | Olwal et al. |
| 10,368,212 B2 | 7/2019 | Kweon et al. |

(Continued)

FOREIGN PATENT DOCUMENTS

| KR | 1020150129546 A | 11/2015 |
| KR | 1020160128119 A | 11/2016 |

(Continued)

OTHER PUBLICATIONS

International Search Report and Written Opinion for International Application No. PCT/US2021/019644, dated Jun. 15, 2021 (Jun. 15, 2021)—9 pages.

(Continued)

*Primary Examiner* — Patrick N Edouard
*Assistant Examiner* — Joseph P Fox
(74) *Attorney, Agent, or Firm* — CM Law; Stephen J. Weed

(57) ABSTRACT

System, method, and non-transitory computer readable medium for presenting images on a mobile device. Images are presented by monitoring one or more physical characteristics surrounding the mobile device using at least one sensor, determining a contextual state of the mobile device based on the monitored one or more physical characteristics, selecting an image from a plurality of related images associated with the determined contextual state, generating at least one overlay image from the selected image, and presenting the at least one overlay image with an optical assembly of the mobile device.

20 Claims, 14 Drawing Sheets

(56) References Cited

U.S. PATENT DOCUMENTS

| | | |
|---|---|---|
| 10,495,878 B2 | 12/2019 | Chi et al. |
| 10,949,882 B2 * | 3/2021 | Du .................... G06T 19/20 |
| 11,686,940 B2 | 6/2023 | Meisenholder |
| 2001/0040591 A1 * | 11/2001 | Abbott ................ G06F 16/40 |
| | | 715/700 |
| 2013/0187835 A1 | 7/2013 | Vaught et al. |
| 2016/0203639 A1 * | 7/2016 | Bostick ............. G02B 27/017 |
| | | 345/619 |
| 2017/0115742 A1 * | 4/2017 | Xing .................. G06F 3/0485 |
| 2017/0287007 A1 | 10/2017 | Du |
| 2017/0366951 A1 | 12/2017 | Kweon et al. |
| 2018/0048722 A1 * | 2/2018 | Fadeev ................ H04L 67/53 |
| 2018/0189568 A1 | 7/2018 | Powderly et al. |
| 2019/0026958 A1 * | 1/2019 | Gausebeck ............ G06T 7/579 |
| 2019/0221191 A1 | 7/2019 | Chhipa et al. |
| 2019/0227316 A1 | 7/2019 | Lee et al. |
| 2019/0265487 A1 | 8/2019 | Holland et al. |

FOREIGN PATENT DOCUMENTS

| | | | |
|---|---|---|---|
| KR | 1020170141473 A | 12/2017 | |
| WO | WO-2017196294 A1 * | 11/2017 | ........... G02B 27/017 |

OTHER PUBLICATIONS

Extended European Search Report for European Application No. 21771096.1, dated Apr. 4, 2024 (Apr. 4, 2024)—10 pages.

* cited by examiner

CONTEXT-BASED IMAGE STATE SELECTION

CROSS-REFERENCE TO RELATED APPLICATIONS

This application is a Continuation of U.S. application Ser. No. 16/824,250 filed on Mar. 19, 2020, the contents of which are incorporated fully herein by reference.

TECHNICAL FIELD

The present subject matter relates to mobile devices, e.g., eyewear devices, and, more particularly, to visually presenting images based on context.

BACKGROUND

Mobile devices, including cellular telephones and eyewear devices, such as smart glasses, headwear, and headgear, integrate image displays and cameras. Such devices can capture and present images. Many mobile devices also integrate sensors capable of determining physical parameters surrounding the mobile devices.

BRIEF DESCRIPTION OF THE DRAWINGS

The drawing figures depict one or more implementations, by way of example only, not by way of limitations. In the figures, like reference numerals refer to the same or similar elements with a letter designation added to differentiate between the same or similar elements. The letter designation may be dropped when the same or similar elements are referred to collectively or when referring to a non-specific one of the same or similar elements.

DETAILED DESCRIPTION

Figure 1A:
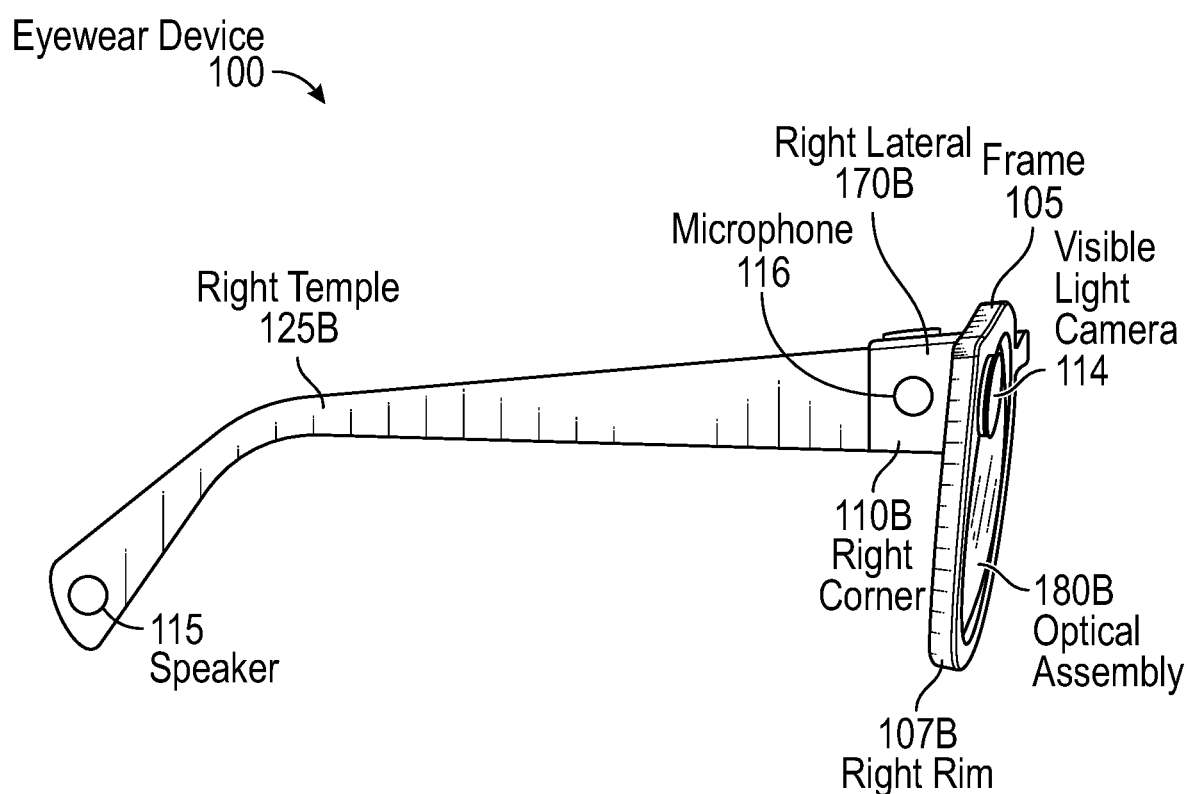
FIG. 1A is a side view of an example hardware configuration of an eyewear device, which includes a visible light camera on a corner and a speaker on a temple.

The following detailed description includes examples for selecting images for display by a user's mobile device (e.g., an eyewear device) based on the contextual state in which the mobile device is operating. For example, if the mobile device is in a car, the mobile device selects an image associated with driving for display and, if the mobile device is in a store, the mobile device selects an image associated with shopping for display. This may be used, for example, to provide the user of the mobile device with visual alerts/reminders related to the activity/context. For example, the image associated with driving may include an animated image wearing a seatbelt and the images associated with shopping may depict a sign indicating a sale is presently in progress.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element. As used herein, the term "about" means±10% from the stated amount.

The orientations of the mobile devices, eyewear devices, associated components and any complete devices incorporating a camera such as shown in any of the drawings, are given by way of example only, for illustration and discussion purposes. In operation, for particular programming, devices may be oriented in any other direction suitable to the particular application, for example up, down, sideways, or any other orientation. Also, to the extent used herein, any directional term, such as front, rear, inward, outward, toward, left, right, lateral, longitudinal, up, down, upper, lower, top, bottom and side, are used by way of example only, and are not limiting as to direction or orientation of any camera or component of a camera constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

FIG. 1A depicts an example hardware configuration of a mobile device in the form of an eyewear device 100 for determining a contextual state in which the mobile device is operating and displaying images associated with those states. The mobile device may take other forms such as a mobile phone or a tablet. Additionally, the eyewear device 100 can take other forms and may incorporate other types of frameworks, for example, a headgear, a headset, or a helmet. The eyewear device 100 includes at least one visible light camera 114 on a corner 110B for capturing images in a viewing area (e.g., field of view). The illustrated eyewear device 100 also includes a speaker 115 and a microphone 116.

The visible light camera 114 is sensitive to the visible light range wavelength. As shown in the example, the visible light camera 114 has a front facing field of view from the perspective of a wearer that is configured to capture images of a scene being viewed thought an optical assembly 180B. Examples of such a visible light camera 114 include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. The eyewear device 100 captures image sensor data from the visible light camera 114, and optionally other data such as geolocation data and audio data (via microphone 116), digitizes the data using one or more processors, and stores the digitized data in a memory. The term "field of view" describes the viewing area which the user of a mobile device can see with his or her eyes through optical assemblies 180 or on a display of a mobile device presenting information captured with the visible light camera 114.

Visible light camera 114 may be coupled to an image processor (element 312 of FIG. 3A) for digital processing and adding of timestamp and location coordinates corresponding to when and where an image of a scene is captured. Image processor 312 includes circuitry to receive signals from the visible light camera 114 and process those signals from the visible light camera 114 into a format suitable for storage in memory (element 334 of FIG. 3A). The timestamp can be added by the image processor 312 or other processor, which controls operation of the visible light camera 114. The image processor 312 may additionally add the location coordinates, e.g., received from a global positioning system (element 331 of FIG. 3A).

The microphone 116 may be coupled to an audio processor for digital processing and adding a timestamp indicating when audio is captured. The audio processor includes circuitry to receive signals from the microphone 116 (or from memory) and process those signals into a format suitable for storage in the memory 334 and/or presentation by speaker 115. The timestamp can be added by the audio processor or other processor, which controls operation of the speaker 115 and the microphone 116.

Figure 1B:
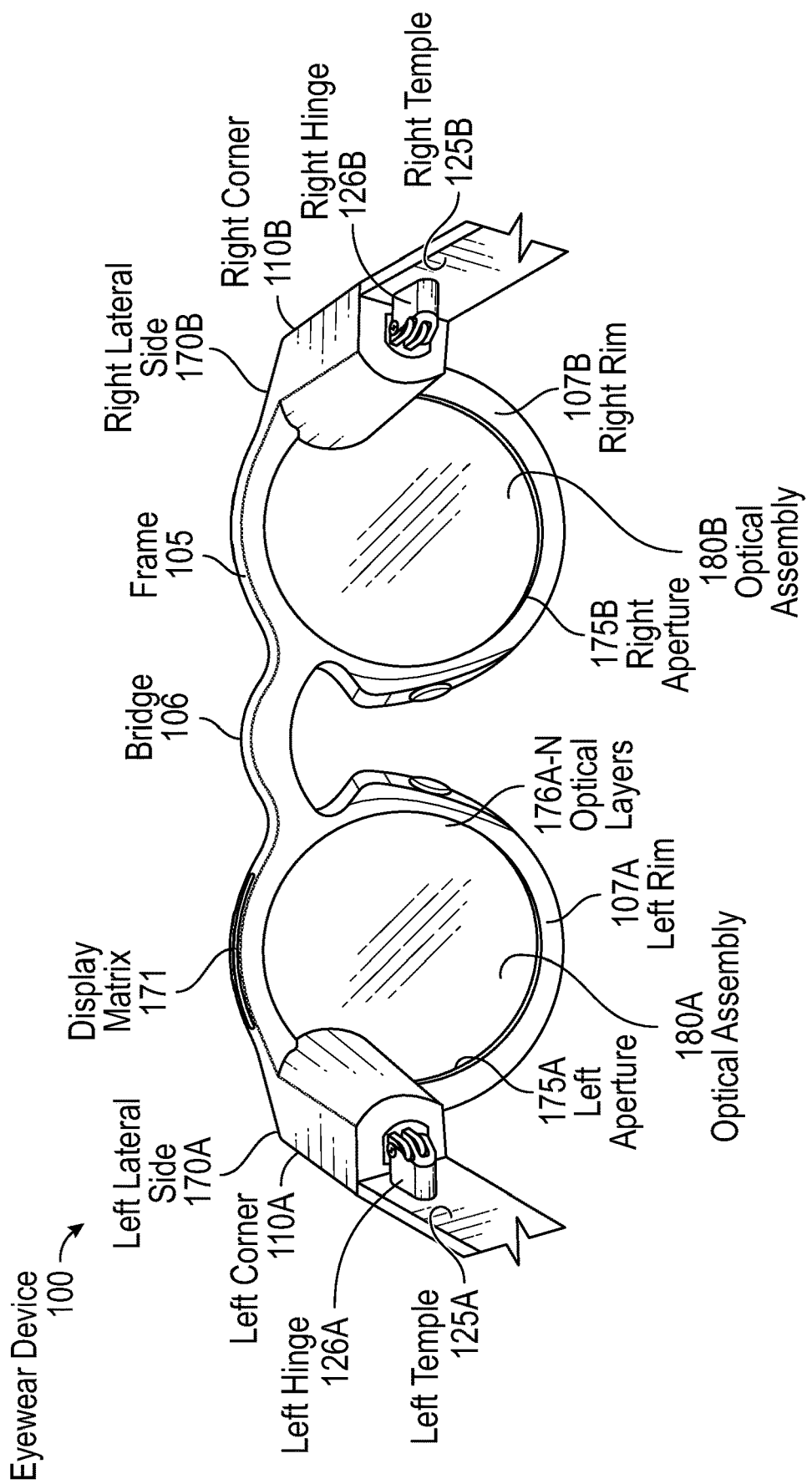
FIGS. 1B and 1C are rear views of example hardware configurations of the eyewear device of FIG. 1A, including two different types of image displays.
Figure 1C:
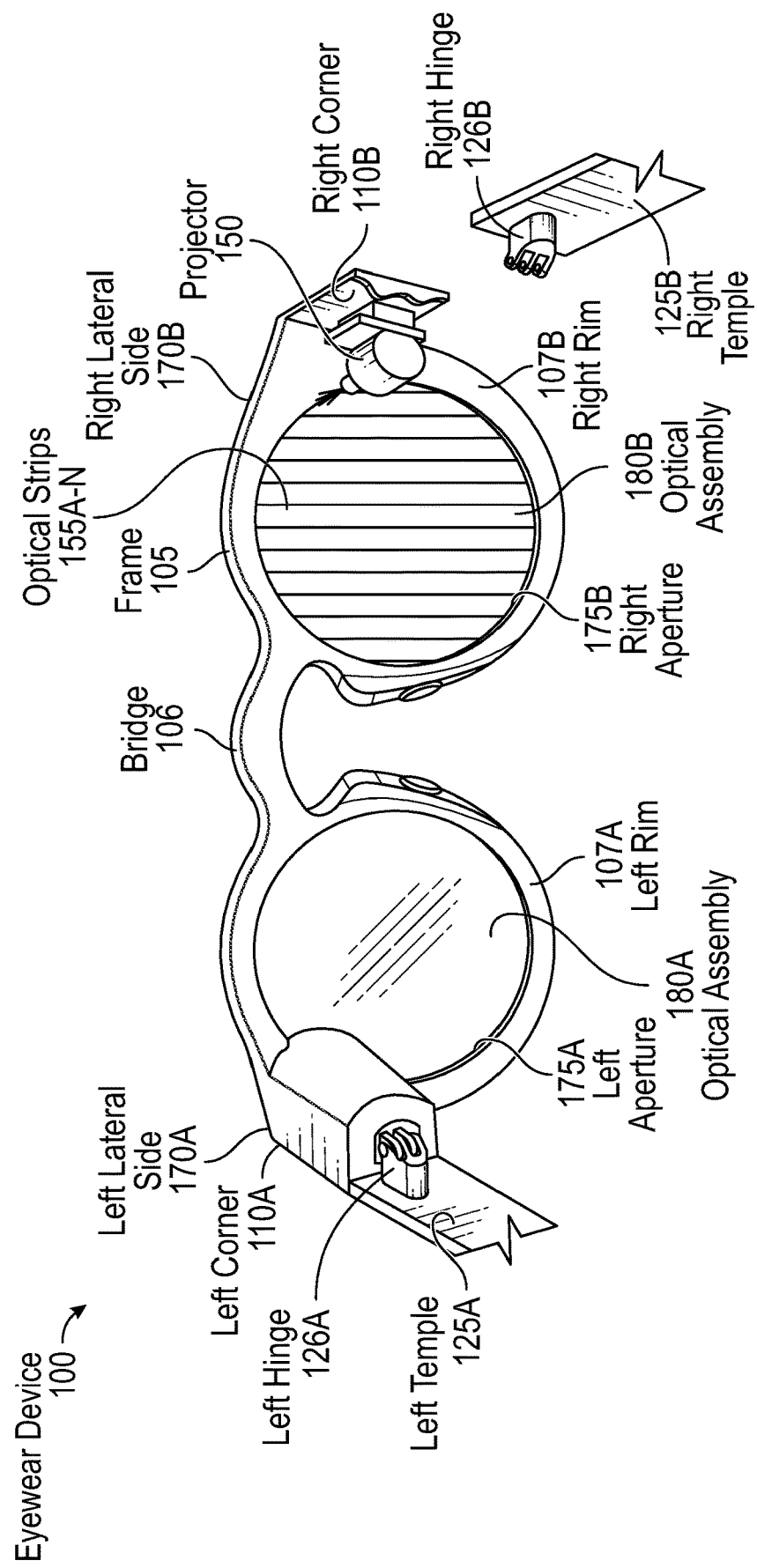

As shown in FIGS. 1A, 1B, and 1C, the eyewear device 100 includes a frame 105 having a left rim 107A connected to a right rim 107B via a bridge 106 adapted for a nose of the user. The left and right rims 107A-B include respective apertures 175A-B that hold a respective optical assembly 180A-B. Left and right temples 125A-B extend from respective lateral sides 170A-B of the frame 105, for example, via respective left and right corners 110A-B. Each temple 125A-B is connected to the frame 105 via a respective hinge 126A-B. A substrate or materials forming the frame 105, corners 110, and temples 125A-B can include plastic, acetate, metal, or a combination thereof. The corners 110A-B can be integrated into or connected to the frame 105 and/or temples 125A-B.

Although shown as having two optical assemblies 180A-B, the eyewear device 100 can include other arrangements, such as a single assembly or three optical assemblies, or the optical assembly 180A-B may have a different arrangement depending on the application or intended user of the eyewear device 100.

In one example, such as depicted in FIG. 1B, each optical assembly 180A-B includes a display matrix 171 and an optical layer or layers 176A-N. The display matrix 171 may include a liquid crystal display (LCD), an organic light-emitting diode (OLED) display, or other such display. The optical layer or layers 176 may include lenses, optical coatings, prisms, mirrors, waveguides, optical strips, and other optical components in any combination. As used herein, the term lens is meant to cover transparent or translucent pieces of glass or plastic having curved and/or flat surfaces that cause light to converge/diverge or that cause little or no convergence or divergence.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 171, and the light that travels through the prism, so that the image viewed from the second surface is larger in one or more dimensions than the image emitted from the display matrix 171.

In another example, such as depicted in FIG. 1C, the image display device of optical assembly 180A-B includes a projection image display. The illustrated projection image display includes a laser projector 150 (e.g., a three-color laser projector using a scanning mirror or galvanometer) disposed adjacent one of the corners 110A-B of the eyewear device 100 and optical strips 155A-N spaced apart across the width of the lens of the optical assembly 180A-B or across a depth of the lens between the front surface and the rear surface of the lens.

As the photons projected by the laser projector 150 travel across the lens of the optical assemblies 180A and 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals.

In one example, the produced visible output on the optical assembly 180A-B of the eyewear device 100 includes an overlay image that overlays at least a portion of the field of view through the optical assemblies 180A-B. In one example, the optical assemblies 180A-B are see-through displays that present the overlay image as an overlay on a scene (or features within a scene) that the wearer is viewing through the lenses of the optical assembly. In another example the optical assemblies 180A-B are not see-through displays (e.g., are opaque displays) that present the overlay image by combining the overlay with real-time images captured by the cameras 114 of the eyewear device for presentation to the user on the displays.

As noted above, the eyewear device 100 is coupled to a processor and a memory, for example in the eyewear device 100 itself or another part of the system. Eyewear device 100 or the system can subsequently process images captured of the eye, for example, a coupled memory and processor in the system to process the captured images of the eye to track eye movement. Such processing of the captured images establishes a scanpath to identify movement of the user's eye. The scanpath includes the sequence or series of eye movements based on captured reflection variations of the eye. Eye movements are typically divided into such fixations and saccades—when the eye gaze pauses in a certain position, and when it moves to another position, respectively. The resulting series of fixations and saccades is called the scanpath. Smooth pursuit describes the eye following a moving object. Fixational eye movements include micro saccades: small, involuntary saccades that occur during attempted fixation. The scanpaths are then utilized to determine the field of view adjustment.

An eye direction database can be established during calibration. Since the known fixed position of the respective point of interests during calibration are known, that scanpath database can be used to establish similarities to the previously obtained calibration images. Because the known fixed position of the point of interest is known from the calibration image and is recorded in the eye direction database, the eyewear device 100 can determine where the eye of the user is looking by comparing currently captured images of the eye with the eye direction database. The calibration image(s) which most closely resembles the currently captured image can have the known fixed position of the point of interest utilized as a good approximation of the eye direction for the currently captured image.

Figure 2:
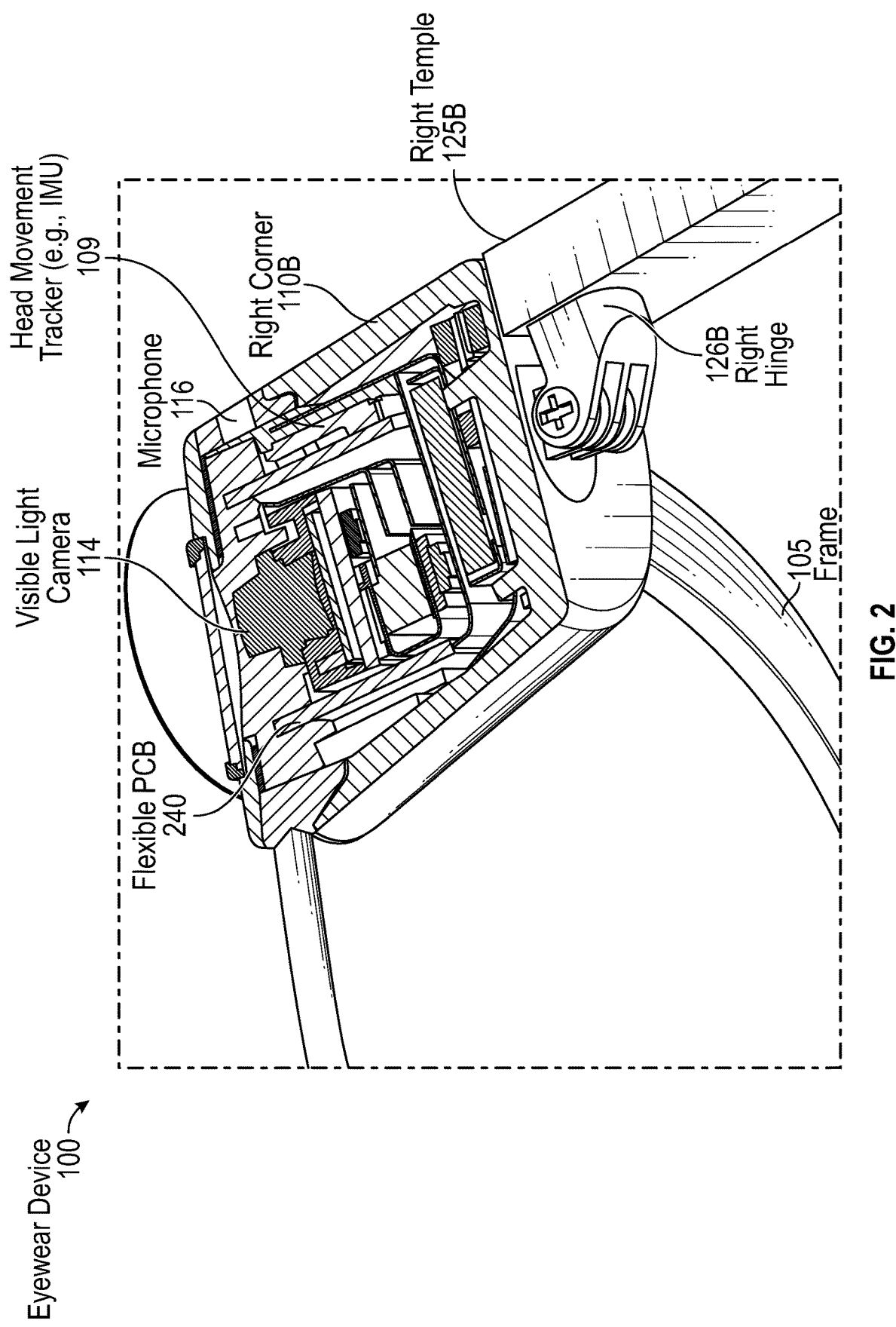
FIG. 2 is a top cross-sectional view of a corner of the eyewear device of FIG. 1A depicting the visible light camera, a head movement tracker, and a circuit board.

FIG. 2 is a top cross-sectional view of the corner of the eyewear device 100 of FIG. 1A depicting the right visible light camera 114, a head movement tracker 109, and a microphone 116. Construction and placement of a left visible light camera is substantially similar to the right visible light camera 114, except the connections and coupling are on the left lateral side 170A.

A right corner 110B includes a corner body and a corner cap, with the corner cap omitted in the cross-section of FIG. 2. As shown, the eyewear device 100 includes a circuit board, which may be a flexible printed circuit board (PCB) 240, having controller circuits for right visible light camera 114, microphone(s), low-power wireless circuitry (e.g., for wireless short range network communication via Bluetooth™), high-speed wireless circuitry (e.g., for wireless local area network communication via WiFi). The right hinge 126B connects the right corner 110B to a right temple 125C of the eyewear device 100. In some examples, components of the right visible light camera 114, the flexible PCB 140, or other electrical connectors or contacts may be located on the right temple 125C or the right hinge 126B.

The head movement tracker 109 includes, for example, an inertial measurement unit (IMU). An IMU is an electronic device that measures and reports a body's specific force, angular rate, and sometimes the magnetic field surrounding the body, using a combination of accelerometers and gyroscopes, sometimes also magnetometers. The IMU works by detecting linear acceleration using one or more accelerometers and rotational rate using one or more gyroscopes. Typical configurations of IMUs contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the movement of the head of the user further includes measuring, via the inertial measurement unit 109, a successive head direction on the horizontal axis, the vertical axis, or the combination thereof during presentation of the initial displayed image.

Figure 3A:
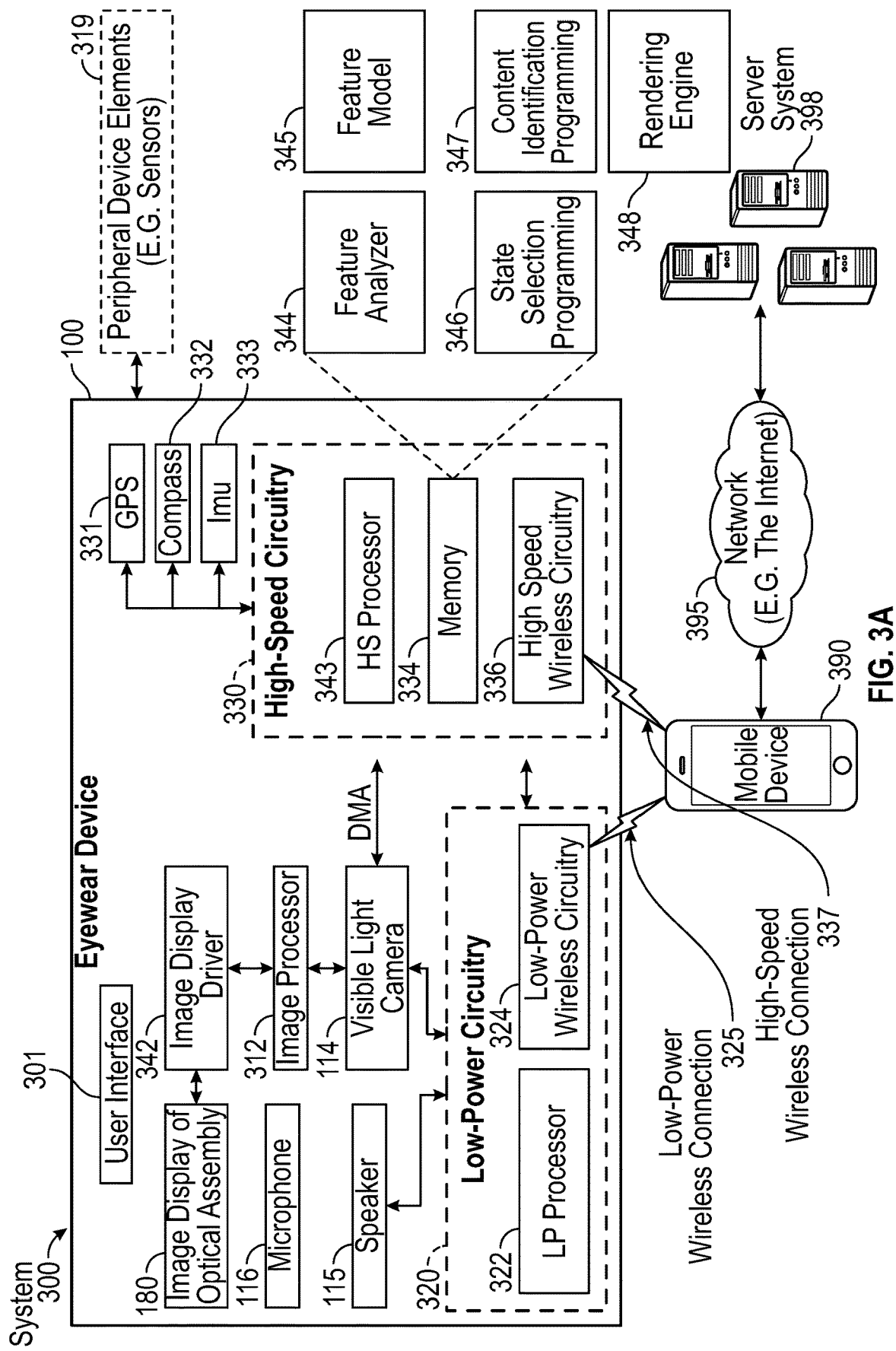
FIG. 3A is a high-level functional block diagram of an example image selection and display system including the eyewear device, a mobile device, and a server system connected via various networks.

FIG. 3A is a high-level functional block diagram of an example image selection and display system 300. The image selection and display system 300 includes a mobile device, which is the eyewear device 100 in the example. The mobile device can communicate via one or more wireless networks or wireless links with other mobile devices 390 or server systems 398. The image selection and display system 300 further includes the other mobile devices 390 and server systems 398. A mobile device 390 may be a smartphone, tablet, laptop computer, access point, or other such device capable of connecting with eyewear device 100 using, for example, a low-power wireless connection 325 and a high-speed wireless connection 337. The mobile device 390 is connected to the server system 398 via the network 395. The network 395 may include any combination of wired and wireless connections.

The eyewear device 100 includes and supports a visible light camera 114, a speaker 115, a microphone 116, a user interface 301, an image display of the optical assembly 180, image display driver 342, image processor 312, audio processor, low-power circuitry 320, and high-speed circuitry 330. The components shown in FIG. 3A for the eyewear device 100 are located on one or more circuit boards, for example a PCB or flexible PCB, in the temples. Alternatively, or additionally, the depicted components can be located in the corners, frames, hinges, or bridge of the eyewear device 100. Memory 334 includes feature analyzer 344, feature model 345, state selection programming 346, and content identification programming 347 to perform the functions described herein for image selection and display. Memory 334 additionally includes a rendering engine 348 for rendering overlay images on the displays 180A and 180B using image processor 312 and image display driver 342.

Feature analyzer 344 implements instructions to cause the eyewear device 100 to process objects and/or aspects identified from a scene viewed through the eyewear device 100. Feature model 345 is a machine learning model trained to identify objects (such as doors, forks, plates, cars, windows, people, animals, etc.) and/or aspects (such as movement, straight lines, curved lines, materials). State selection programming 346 implements instructions to cause the eyewear device 100 to determine the contextual state in which the eyewear device 100 is currently operating. Content identification programming 347 implements instructions to cause the eyewear device 100 to select content (e.g., images) responsive to the determined contextual state.

As shown in FIG. 3A, high-speed circuitry 330 includes high-speed processor 343, memory 334, and high-speed wireless circuitry 336. In an example, the image display driver 342 is operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In some examples, the high-speed processor 343 executes an operating system such as a LINUX operating system or other such operating system of the eyewear device 100 and the operating system is stored in memory 334 for execution. In addition to any other responsibilities, the high-speed processor 343 executes a software architecture for the eyewear device 100 to manage data transfers with high-speed wireless circuitry 336. In some examples, high-speed wireless circuitry 336 is configured to implement Institute of Electrical and Electronic Engineers (IEEE) 802.11 communication standards, also referred to herein as Wi-Fi. In other examples, high-speed wireless circuitry 336 implements other high-speed communications standards.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes a storage device capable of storing various data and applications, including, among other things, camera data generated by the visible light camera 114 and the image processor 312, as well as images generated for display by the image display driver 342 on the image display of the optical assembly 180 and audio data generated by the microphone 116 and the audio processor. While memory 334 is shown as integrated with high-speed circuitry 330, in other examples, memory 334 may be an independent stand-alone element of the eyewear device 100. In some examples, electrical routing lines may provide a connection through a chip that includes the high-speed processor 343 from the image processor 312/audio processor or low-power processor 324 to the memory 334. In other examples, the high-speed processor 343 may manage addressing of memory 334 such that the low-power processor 324 will boot the high-speed processor 343 any time that a read or write operation involving memory 334 is needed.

Eyewear device 100 further includes a global positioning system 331, a compass 332, and an inertial measurement unit 333. GPS 331 is a receiver for use in a satellite-based radio navigation system that receives geolocation and time information from GPS satellites. Compass 332 provides direction relative to geographic cardinal directions (or points). IMU 333 is an electronic device that measures and reports a force, angular rate, and/or orientation using a combination of accelerometers, gyroscopes, and/or magnetometers.

Eyewear device 100 may connect with a host computer. For example, the eyewear device 100 may pair with the mobile device 390 via the high-speed wireless connection 337 or connected to the server system 398 via the network 395. In one example, eyewear device 100 captures, via the camera 114, image of a scene and sends the images to the host computer for forwarding to server system 398 for training feature model 364. In another example, the eyewear device 100 receives images and/or instructions from the host computer.

The eyewear device 100 further includes other output component and input components. The other output components include acoustic components (e.g., speakers 115), haptic components (e.g., a vibratory motor), and other signal generators. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Image selection and display system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the image selection and display system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

In one example, image processor 312 comprises a microprocessor integrated circuit (IC) customized for processing image sensor data from the visible light camera 114, along with volatile memory used by the microprocessor to operate. In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In some examples, minimal processing of the camera signal from the visible light camera 114 is performed by the image processor 312, and additional processing may be performed by applications operating on the mobile device 390 or server system 398.

Low-power circuitry 320 includes low-power processor 322 and low-power wireless circuitry 324. These elements of low-power circuitry 320 may be implemented as separate elements or may be implemented on a single IC as part of a system on a single chip. Low-power processor 324 includes logic for managing the other elements of the eyewear device 100. Low-power processor 324 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other examples, other low power communication systems may be used.

Figure 4:
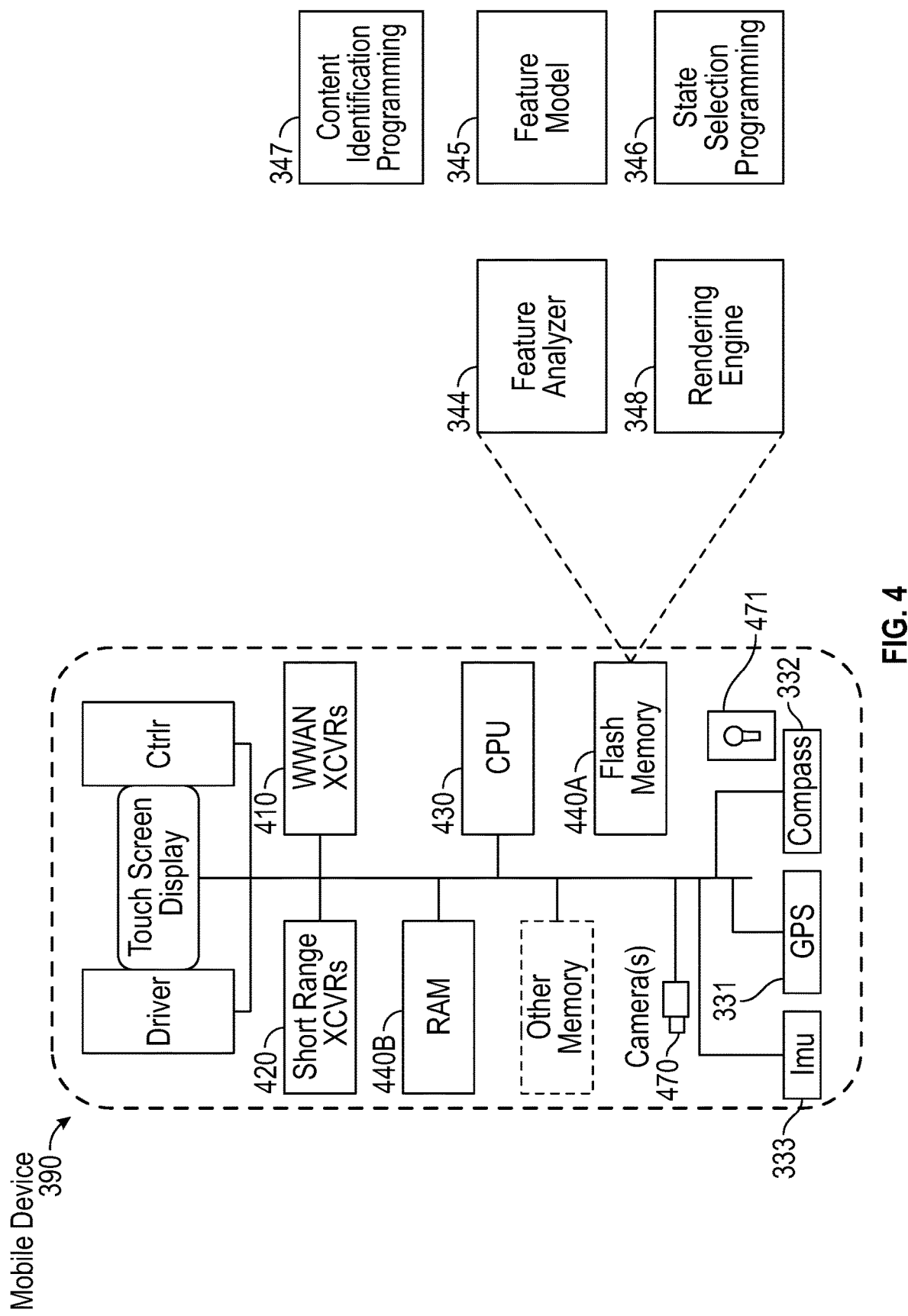
FIG. 4 is a simplified block diagram of a hardware configuration for the mobile device.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

Figure 3B:
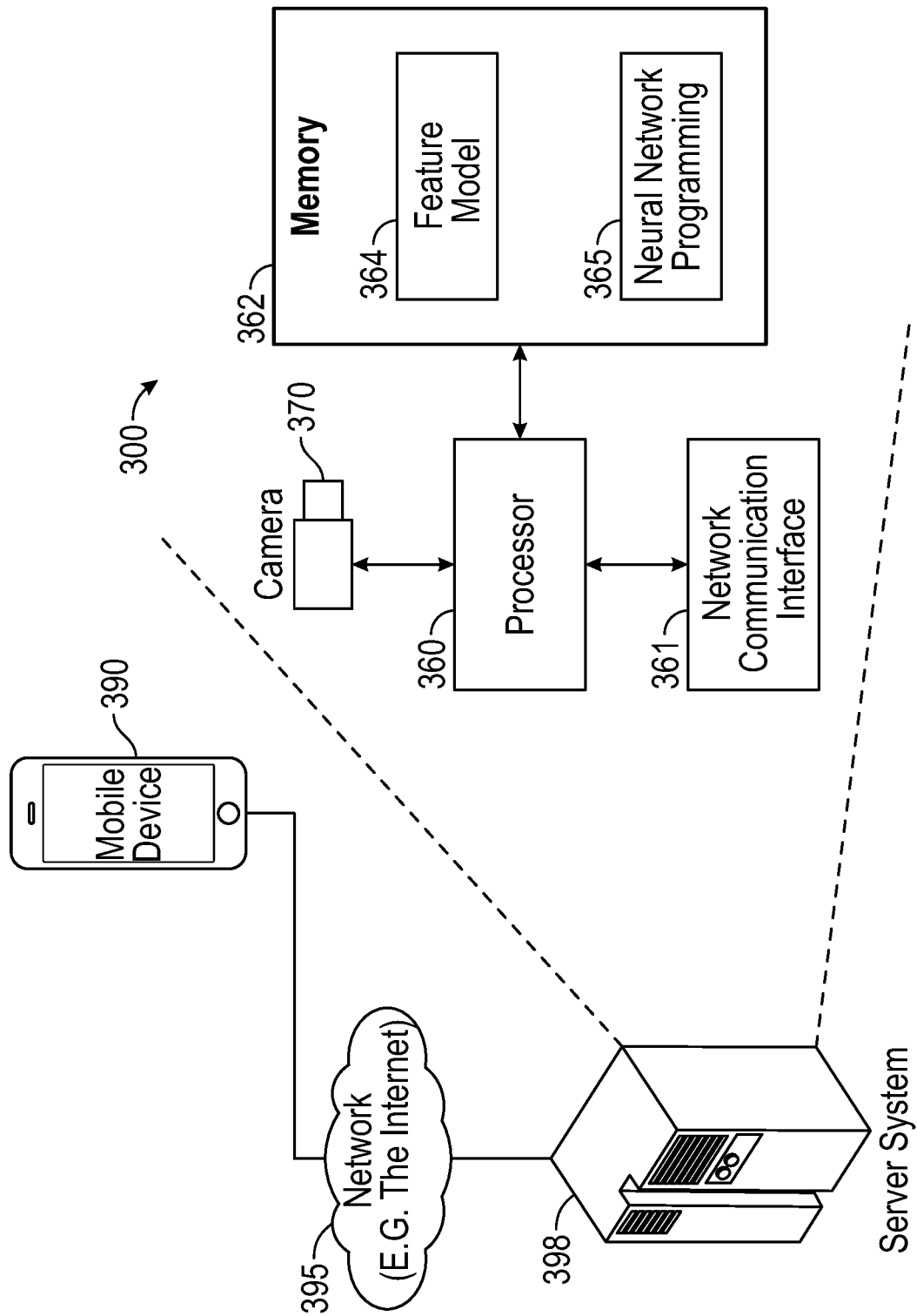
FIG. 3B is a simplified block diagram of an example of a hardware configuration for the server system of the audio visualizer system of FIG. 3A.

As shown in FIG. 3B, the server system 398 may be one or more computing devices as part of a service or network computing system, for example, that include a processor 360, a memory 362, and network communication interface 361 to communicate over the network 395 with the mobile device 390 and eyewear device 100. The memory 362 includes a feature model 364 and neural network programming 365. Execution of the neural network programming 365 by the processor 360 configures the server system 398 to perform some of the functions described herein.

In one example, the server system 398 receives, via the network 395, images of the scene from the eyewear device 100 via the mobile device 390 and from other eyewear devices for use by the neural network programming 365 to train the feature model 364. The server system 398 sends the trained feature model to the eyewear device 100 for use in identifying features corresponding to contextual states.

The feature model 346 of the eyewear device 100 can be a mirror image of the feature model 364 of the server system 398. Feature model 346 of the eyewear device 100 is stored locally in a read-only memory (ROM), erasable programmable read-only memory (EPROM), or flash memory of high-speed circuitry 330.

FIG. 4 is a high-level functional block diagram of an example of a mobile device 390 that provides processing for the image selection and display system 300 of FIG. 3A. Shown are elements of a touch screen type of mobile device 390 having feature analyzer 344, feature model 345, state selection programming 346, content identification programming 347, and rendering engine 348 loaded along with other applications such as a chat application. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s), and a microphone 471.

As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver 331. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420. Additionally, mobile device 390 can include a compass 332 and an inertial measurement unit 333 for determining direction information.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

The mobile device 390 further includes a microprocessor, shown as CPU 430. A processor is a circuit having elements structured and arranged to perform one or more processing functions, typically various data processing functions.

Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to determining the location of the device when an image is captured and determining the location and orientation of the device when generating and presenting image overlays. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g., as a working data processing memory. The flash memory 440A typically provides longer term storage.

Depending on the type of device, the mobile device 390 stores and runs a mobile operating system through which specific applications, which may include feature analyzer 344, feature model 345, state selection programming 346, content identification programming 347, and rendering engine 348, are executed. However, in some implementations, programming may be implemented in firmware or a combination of firmware and an application layer. For example, the instructions to capture the image of the scene, identify features, analyze features, selects states, identify content, and generate an overlay may reside in firmware (e.g., with a dedicated GPU or VPU SOC). Instructions to produce the visible output to the user may reside in an application. Applications, like the state selection programming 346, the content identification programming, and other applications, may be a native application, a hybrid application, or a web application (e.g., a dynamic web page executed by a web browser) that runs on mobile device 390. Examples of mobile operating systems include Google Android, Apple iOS (I-Phone or iPad devices), Windows Mobile, Amazon Fire OS, RIM BlackBerry operating system, or the like.

Figure 5A:
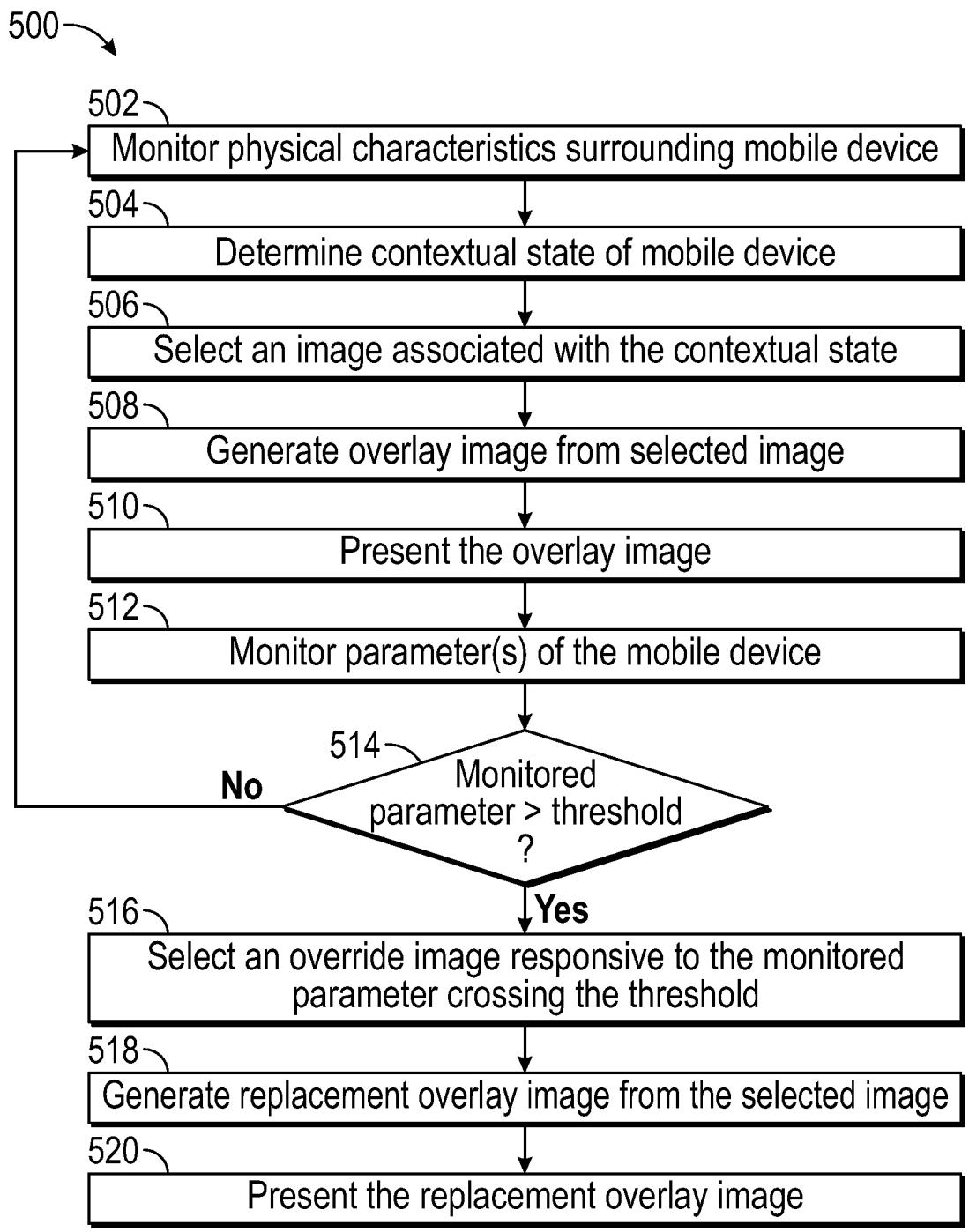
FIGS. 5A, 5B, and 5C are flowcharts of example steps for determining a contextual state of a mobile device and generating an overlay image using an image selected based on the contextual state for use in the image selection and display system of FIG. 3A.
Figure 5B:
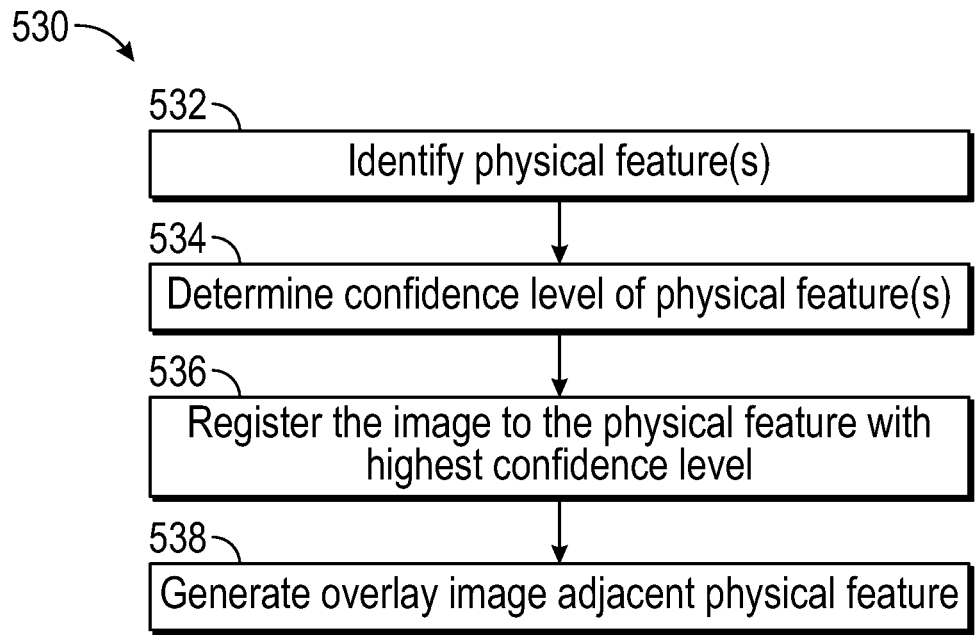
Figure 5C:
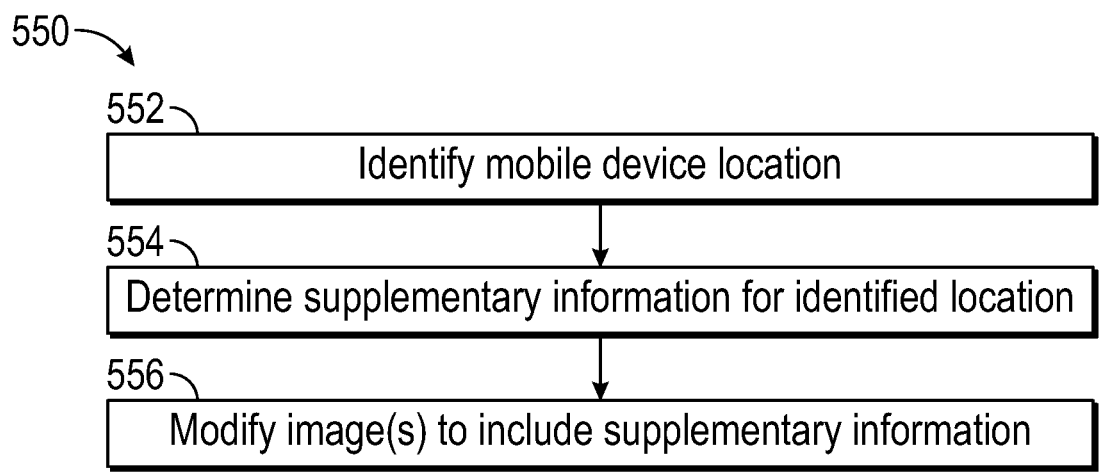

FIGS. 5A, 5B, and 5C are flowcharts 500, 530, and 550, respectively, illustrating example operation of a mobile device (e.g., an eyewear device 100) or a mobile device 390 and other components of the image selection and display system 300. Although shown as occurring serially, one or more of the blocks in flowcharts 500, 530, and/or 550 may be reordered or parallelized depending on the implementation.

The flowcharts are described below with reference to an example where the mobile device is an eyewear device 100 that selects and presents images. It is understood that the functionality described with reference to the eyewear device 100 may be performed by other eyewear devices and other mobile devices such as mobile phones and tablets. Suitable modifications for implementation of the following with other mobile devices (including those with see through displays and those with non-see through displays such as touchscreens) will be readily understood from the description herein.

With reference to flowchart 500 of FIG. 5A, at block 502, the eyewear device 100 monitors physical characteristics. Physical characteristic are characteristics surrounding or associated with the eyewear device 100 that are useful in determining the current context in which the eyewear device is being used. By way of non-limiting example, physical characteristics include velocity, time of day, location, images of its surroundings, etc. The eyewear device 100 monitors the physical characteristics using one or more sensors such as camera 114, microphone 116, GPS 331, compass 332, and inertial measurement unit. Eyewear device 100 may store the physical characteristics in memory 334 for retrieval during processing.

At block 504, the eyewear device 100 determines the contextual state in which it is currently operating. The eyewear device 100 processes the physical characteristics monitored in step 502 to determine its contextual state. The contextual state of the eyewear device 100 represents the setting, situation, and/or location in which the eyewear device 100 is currently operating. By way of non-limiting example, contextual states include dining, evening, shopping, driving, outside, and moving.

In one example, eyewear device 100 retrieves physical characteristics such as images of its surrounding from memory 334 and applies object recognition to the images using feature analyzer 344 and feature model 345. If a plate and a fork are identified in the image, the eyewear device 100 determines that the current context is dining. If the sun is recognized, the eyewear device 100 determines the current context is outside. In the event that multiple contexts may be applicable, e.g., outside and dining, the eyewear device 100 may select the most appropriate context by, for example, weighting recognized objects based on whether the wearer's gaze is directed at an object (e.g., a plate v. a landscape) or by applying feature models 345 to the images to select the most appropriate context based on past training examples.

In another example, eyewear device 100 receives location information (e.g., from GPS 331) and velocity information (e.g., based on GPS signals from GPS 331 or input from IMU 333). If the eyewear device 100 is positioned in a store and the velocity is less than 3 miles per hour, the eyewear device 100 determines the current context is shopping. Alternatively, if the eyewear device 100 is positioned in a roadway and has a velocity of 65 miles per hour, the eyewear device 100 determines the current context is driving in a car. Feature analyzer 344 may apply feature model 345 to images in order to refine the context, e.g., driving the car versus being a passenger and riding in the car.

At block 506, eyewear device 100 selects an image associated with the determined contextual state (block 504). Each potential contextual state is associated with an image with the states, images, and associations stored in the memory 334. Once the contextual state is determined, the image processor 312 of the eyewear device 100 selects the appropriate image by retrieving the image associated with the determined contextual state from the memory 334.

Figure 6A:
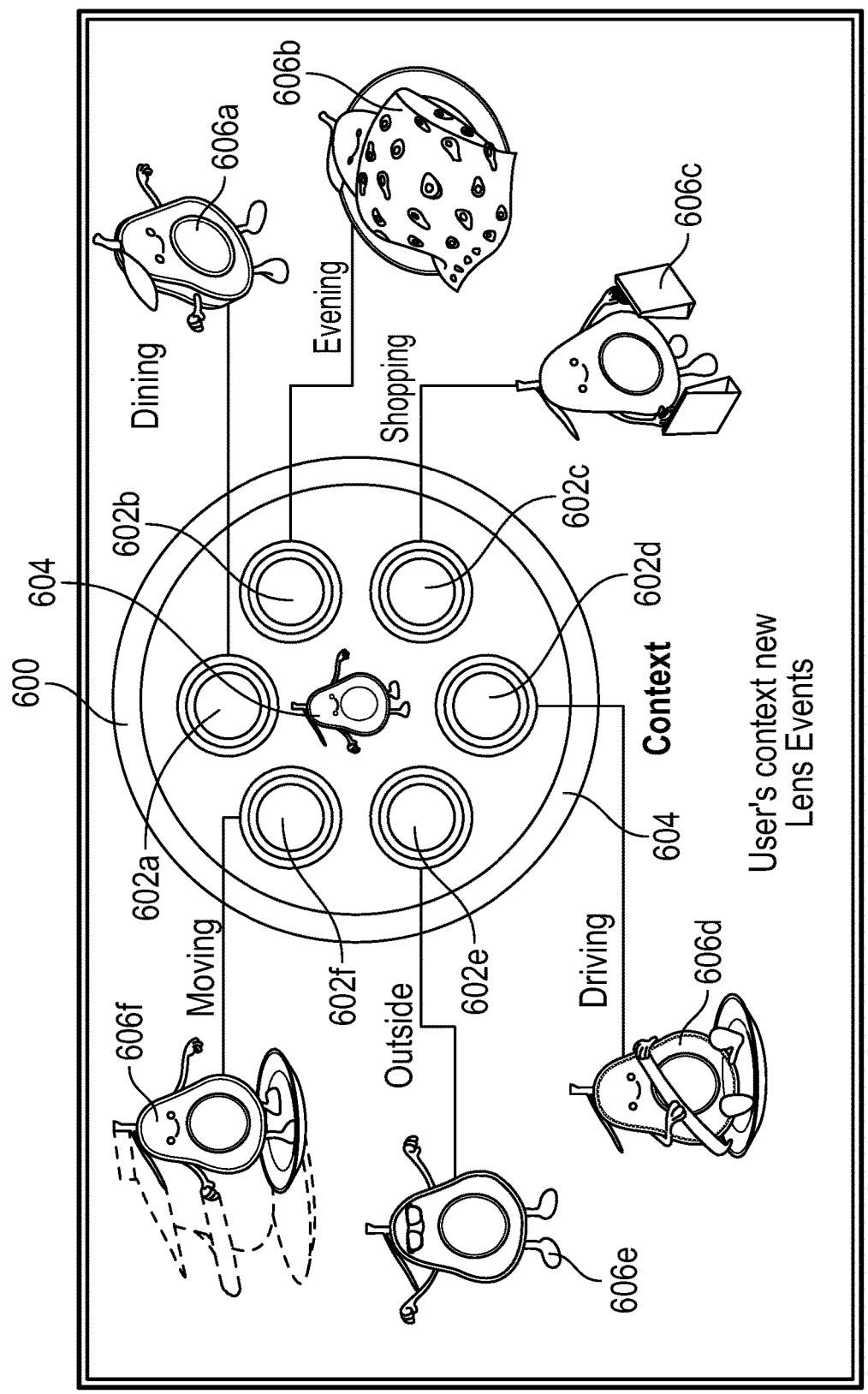
FIG. 6A is an illustration depicting a collection of images corresponding to contextual states.

In one example, a user/wearer of the eyewear device 100 selects a theme, e.g., an avocado, during a configuration stage from multiple available configuration themes. In accordance with this example, the theme is associated with a collection of multiple images where each image corresponds to one of the potential contextual states. FIG. 6A illustrates one potential theme 600 (i.e., avocados) that includes a collection of images representing six potential states 602a-f associated with a cartoon avocado 604. There are six images 606a-f associated with the cartoon avocado, one for each potential state 602a-f (i.e., the evening state 602b is associated with avocado under a blanket 606b and the outside state 602e is associated with the avocado in sunglasses 606e). In another example, the user/wearer may design their own theme by selecting images to correspond to each of the potential contextual states.

At block 508, the eyewear device 100 generates an overlay image including the selected image for presentation by the eyewear device 100. In one example, the image processor 312 of the eyewear device 100 generates overlay images by analyzing an image within a field of view captured by the camera 114 (which represents what the user/wearer is viewing though the eyewear device 100) and positioning the selected image such that it does not obscure recognized objects in the field of view. In another example, the image processor 312 of the eyewear device 100 positions the selected image such that it is always in the same location within the user's field of view (e.g., up and to the right of center). In another example, the image processor 312 of the eyewear device 100 registers the selected image to a particular object (e.g., a plate) and continuously adjusts the position of the selected image within the field of view such that it is always in the same position with respect to the particular object (e.g., adjacent an edge of the plate at the 10 o'clock position) as described below with reference to FIG. 5B.

At block 510, the eyewear device 100 presents the overlay image on the optical assembly 180 of the eyewear device 100. The image processor 312 of the eyewear device 100, by way of image display driver 342, presents the replacement overlay images on the image display of optical assembly 180.

Figure 6B:
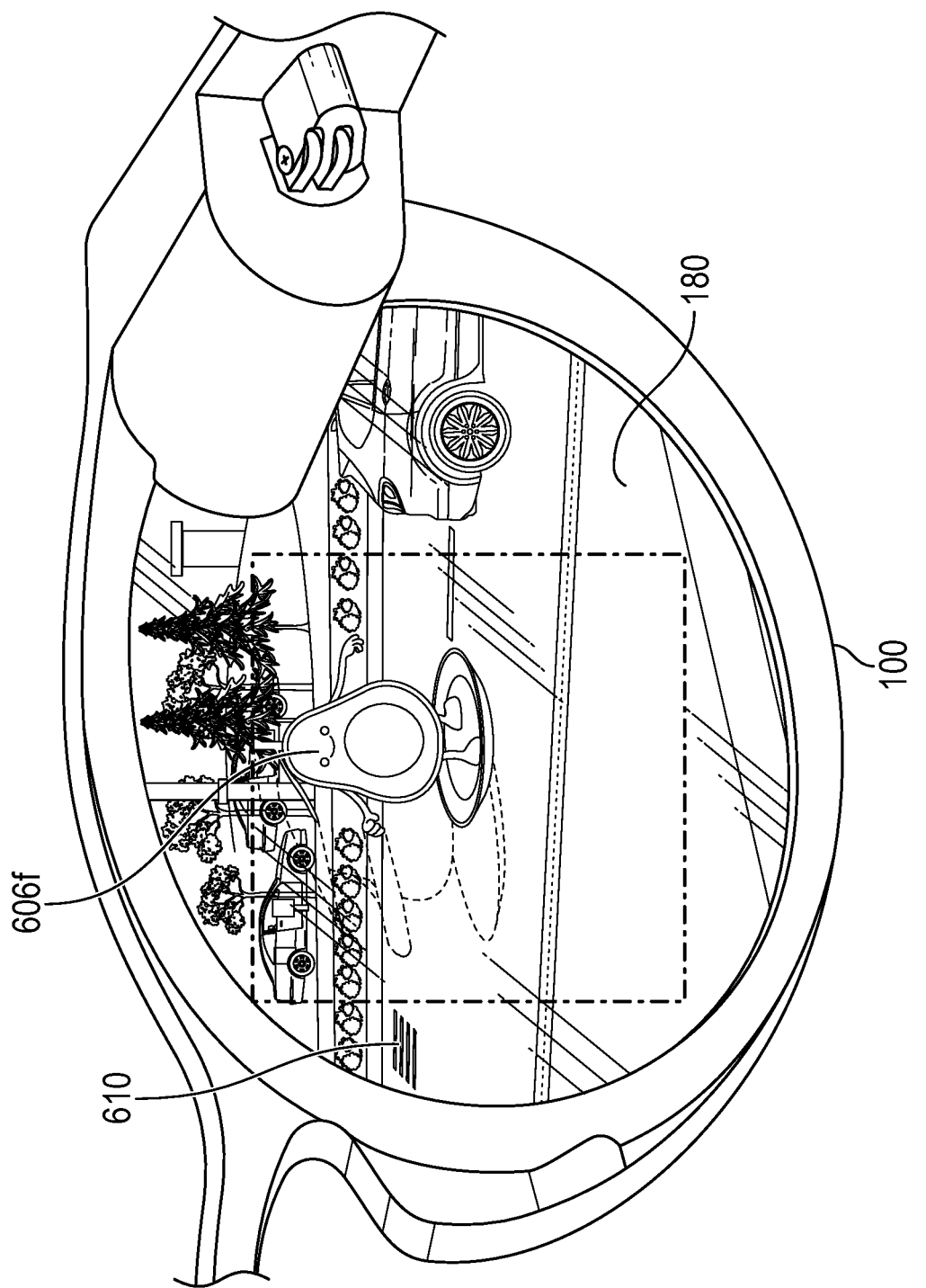
FIGS. 6B, 6C, 6D, and 6E are perspective views of scenes viewed through a see-though optical assembly of an eyewear device with overlay images corresponding to the contextual state within which the mobile device is operating (FIGS. 6B, 6C, and 6D) or to a physical parameter of the mobile device itself (FIG. 6E).

FIG. 6B depicts an example scene with a field of view that is viewed through an optical assembly 180 of the eyewear device 100 including an overlay image. In the illustrated example, the scene is a roadway viewed from a sidewalk outside of a car. The overlay image includes a "moving" avocado 606f associated with a moving context 602f (e.g., determined in accordance with block 504 based on velocity and position with respect to roadway). As illustrated, the moving avocado 606f in centrally positioned in a non-obstructing area (e.g., the roadway 610 in FIG. 6B) by the image display driver 342.

Figure 6C:
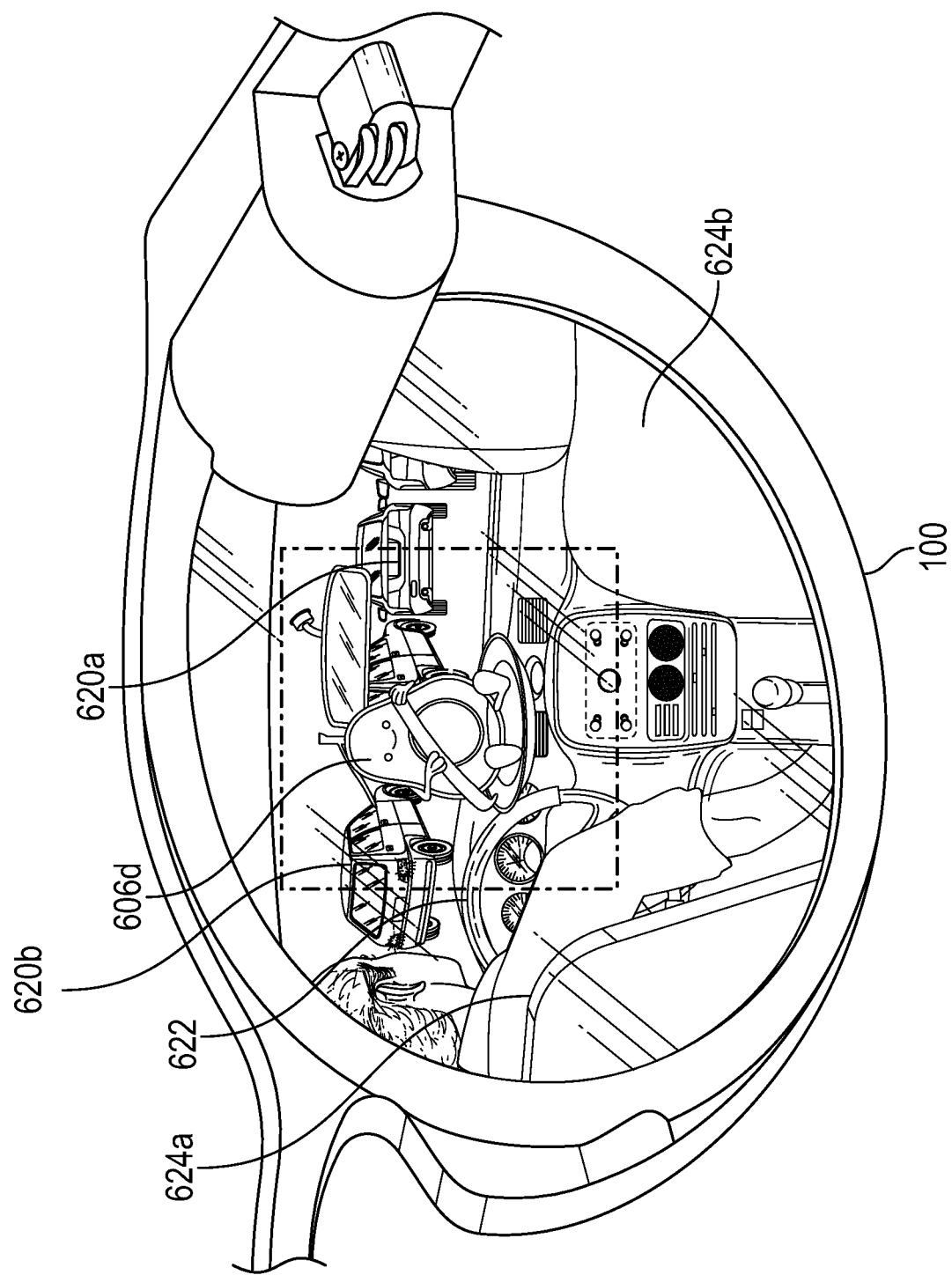

FIG. 6C depicts another example scene viewed through an optical assembly 180 in which the scene is a roadway viewed from within a car. The overlay image includes a "driving" avocado 606d associated with a driving context 602d (e.g., determined in accordance with block 504 based on velocity, position with respect to roadway, identification of cars 620a, b in a roadway through object identification, and identification of objects within a car such as a steering wheel 622, a driver seat 624a and a front passenger seat 624b through object recognition). As illustrated, the driving avocado 606d is registered to a position between the seats 624a, b of the car by the image display driver 342 as described below with reference to FIG. 5B.

Figure 6D:
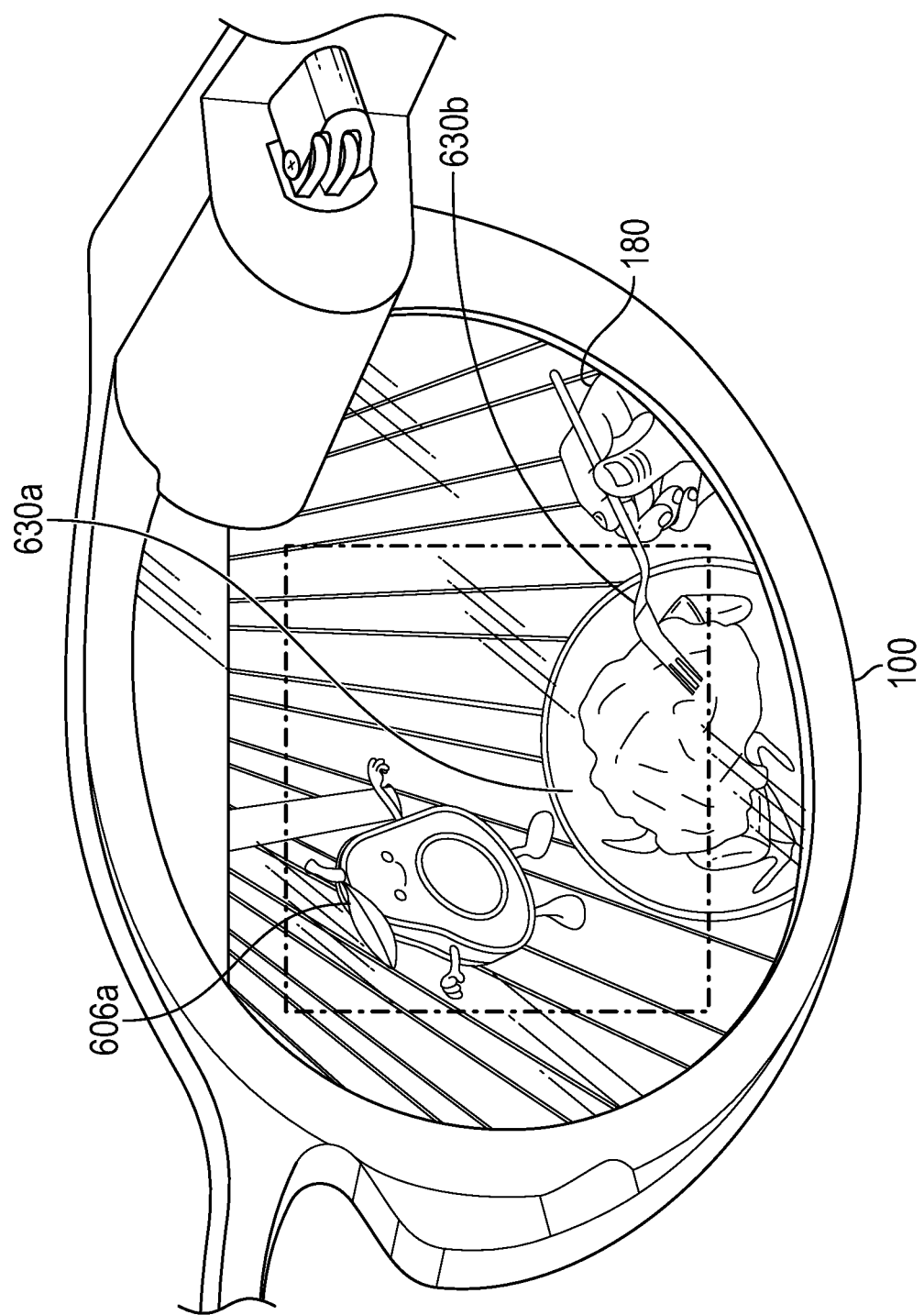

FIG. 6D depicts another example scene viewed through an optical assembly 180 in which the scene includes a meal on a table. The overlay image includes a "dining" avocado 606a associated with a dining context 602a (e.g., determined in accordance with block 504 based on identification of objects such as a plate 630a and a fork 630b through object recognition). As illustrated, the dining avocado 606a in registered to a position with respect to the plate 630a (e.g., 10 o'clock) as described below with reference to FIG. 5B.

At block 512, the eyewear device 100 monitors parameter(s) of the eyewear device 100 such as battery level. Other parameters, by way of non-limiting example, include WiFi signal level, errors, etc.

At decision block 514, a decision is made regarding the monitored parameters. If the monitored parameter crosses a threshold, processing proceeds at block 516. It is noted that the decision may be based on the parameter exceeding an upper limit (as illustrated in FIG. 5A), the parameter meeting a limit (e.g., one critical error code), the parameter falling below a lower limit (e.g., battery charge level, minimum signal level for effective communication, etc.), or other type of comparison. If the monitored parameter does not cross the threshold, processing proceeds at block 502 with the process repeating and replacement images selected as the context within which the eyewear device 100 is operating changes.

At block 516, the eyewear device 100 selects an override image responsive to the monitored parameter crossing the threshold (block 514). In one example, when the battery level of the eyewear device 100 falls below a predefined level (e.g., 10 percent), an override image indicative of sleep (e.g., evening content image 606b as depicted in FIG. 6E or another image) is selected to replace the contextual image (contrast FIG. 6D to FIG. 6E).

At block 518, the eyewear device 100 generates an overlay image including the selected override image for presentation by the eyewear device 100. The image processor 312 of the eyewear device 100 generates replacement overlay images as described above with reference to block 508.

At block 520, the eyewear device 100 presents the overlay image on the optical assembly 180 of the eyewear device 100. The image processor 312 of the eyewear device 100, by way of image display driver 342, presents the replacement overlay images as described above with reference to block 510.

Figure 6E:
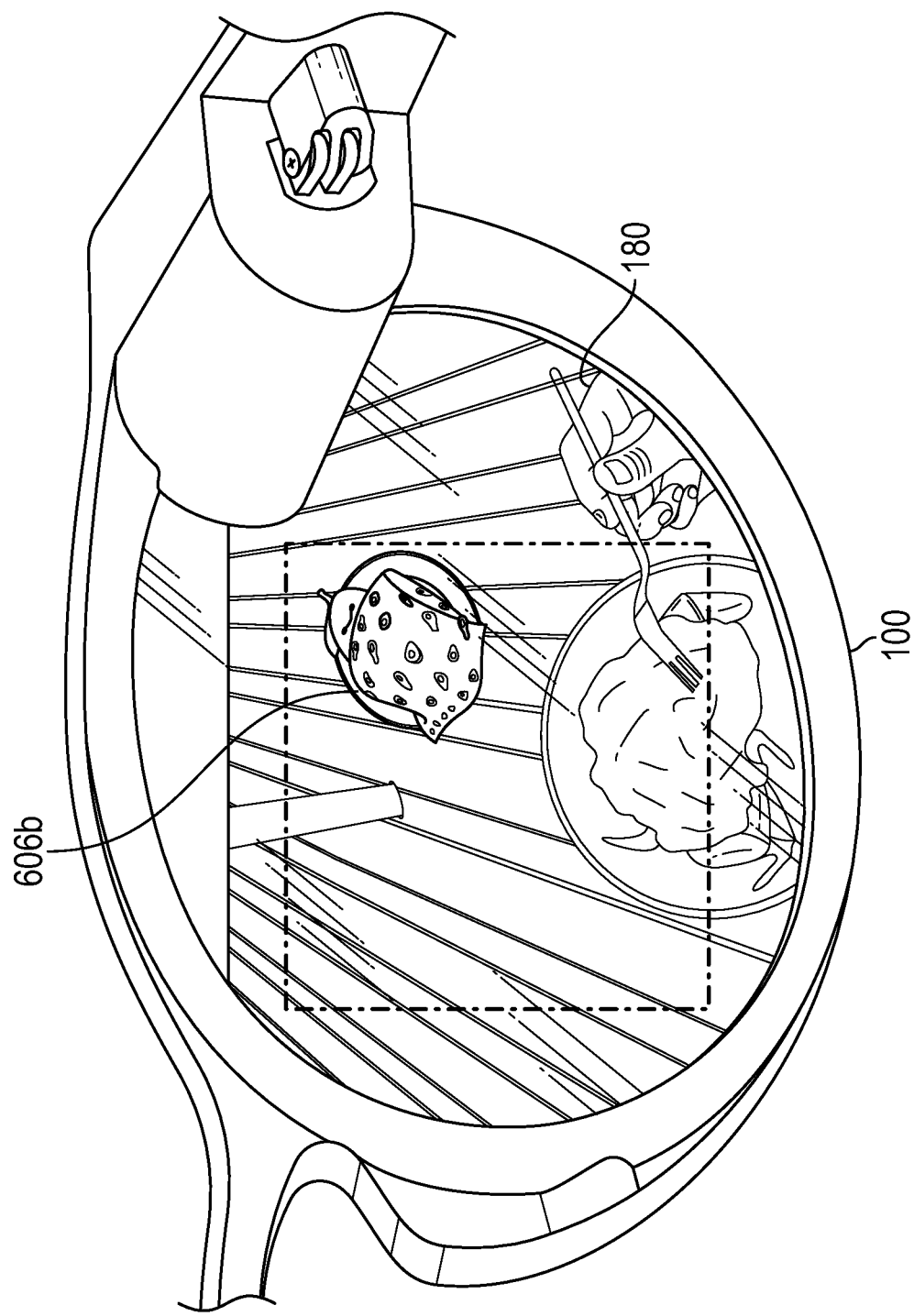

FIG. 6E depicts an example scene with a field of view that is viewed through an optical assembly 180 of the eyewear device 100 including a replacement overlay image. In the illustrated example, the scene is the dining scene of FIG. 6D with the dining context avocado 606a replaced by an evening/sleeping avocado 606b, e.g., to alert the user in a friendly manner that it is time to charge the eyewear device 100.

With reference to flowchart 530 of FIG. 5B, at block 532, the eyewear device 100 identifies one or more physical features (e.g., a plate, a fork, a steering wheel, a seatback, etc.

At block 534, the eyewear device 100 determines a confidence level for the physical features. Feature analyzer 344 may determine confidence levels of features by applying the feature model 345 to images captured by the eyewear device.

At block 536, the eyewear device 100 registers the selected image to the physical feature(s) having the highest confidence levels. Image processor 312 may register the selected images to the physical feature(s).

At block 538, the eyewear device 100 generates overlay images with the selected image adjacent to the physical feature(s) to which it is registered. The image processor 312 of the eyewear device 100 generates the overlay images as described above with reference to block 508.

With reference to flowchart 550 of FIG. 5C, at block 552, the eyewear device 100 identifies its location. The eyewear device may identify its location using GPS coordinates from GPS 331 and a database including particular locations (such as shops, restaurants, parks, historical markers stored in, for example, a database in memory accessible by processor 343).

At block 554, the eyewear device 100 determines supplementary information for the identified location. Supplementary information may include, for example, pricing and sale indication information.

At block 556, the eyewear device 100 modifies the image(s) to include supplementary information. For example, the shopping avocado 606c may be modified to include the word "SALE" on the shopping bags (as depicted in FIG. 6A) or a percent discount currently applicable. In this manner, the system is able to provide even greater contextual information to a user in a friendly manner.

Any of the methods described herein such as the feature analyzer 344, the feature model 345, the state selection programming 346, and programming for the rendering engine 348 for the eyewear device 100, mobile device 390, and server system 398 can be embodied in one or more methods as method steps or in one or more applications as described previously. According to some examples, an "application," "applications," or "firmware" are program(s) that execute functions defined in the program, such as logic embodied in software or hardware instructions. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke application programming interface (API) calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and/or associated data that is carried on or embodied in a type of machine-readable medium. For example, programming code could include code for navigation, eye tracking or other functions described herein. "Storage" type media include any or all the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
   an optical assembly having a viewing area for viewing a scene and configured to present overlay images to a user over the scene in the viewing area;
   at least one sensor configured to sense one or more physical characteristics;
   a memory including a plurality of themes, each theme having a plurality of related images with each of the images associated with a respective contextual state, a first of the plurality of themes having a first image associated with a first respective contextual state in the memory and a second image associated with a second respective contextual state in the memory that is different than the first image;
   a feature model configured to identify at least one of objects or aspects from the scene responsive to the one or more physical characteristics sensed by the at least one sensor;
   a feature analyzer configured to process the at least one of objects or aspects identified by the feature model by weighting the at least one of objects or aspects based on gaze direction of the user;
   a state selector configured to determine the contextual state in which the eyewear device is currently operating responsive to the weighting based on gaze direction of the at least one of objects or aspects from the feature analyzer; and
   a content identifier configured to select content for presentation on the optical assembly responsive to a theme selection by a user and the contextual state in which the eyewear device is currently operating as determined by the state selector, the selected content including a current image, the current image comprising, when the theme selection is the first of the plurality of themes, the first image retrieved from the plurality of related images in the memory when the first contextual state is determined and the second image retrieved from the plurality of related images in the memory when the second contextual state is determined.

2. The eyewear device of claim 1, wherein the eyewear device further comprises:
   a frame supporting the optical assembly; and
   a temple extending from a lateral side of the frame;
   wherein the optical assembly is a see-through optical assembly supported by the frame.

3. The eyewear device of claim 2, further comprising:
   an image processor configured to generate the at least one overlay image for presentation on the optical assembly from the current image.

4. The eyewear device of claim 3, wherein the image processor is further configured to identify a physical feature in a field of view of the optical assembly, register the current image to the physical feature, and generate the at least one overlay image adjacent to the physical feature to which the current image is registered.

5. The eyewear device of claim 1, wherein the optical assembly comprises a camera configured to capture an image of the scene and a display configured to display the captured image and at least one overlay image based on the current image.

6. The eyewear device of claim 1, wherein the state selection is further configured to monitor a parameter of the eyewear device and determine when the monitored parameter crosses a threshold; and
   wherein the content identifier is further configured to select an override image from the plurality of related images responsive to the monitored parameter crossing the threshold.

7. The eyewear device of claim 1, further comprising:
   at least one circuit board, wherein the optical assembly, the at least one sensor, and the memory are coupled to the at least one circuit board.

8. The eyewear device of claim 1, wherein the feature model is a machine learning model trained to identify the at least one of objects or aspects.

9. The eyewear device of claim 8, wherein the objects include one or more objects selected from a group consisting of doors, forks, plates, cars, windows, people, and animals.

10. The eyewear device of claim 8, wherein the aspects include one or more aspects selected from a group consisting of movement, straight lines, curved lines, materials.

11. The eyewear device of claim 1, wherein the contextual state of the eyewear device includes one of a plurality of contextual states selected from a group consisting of: dining, evening, shopping, driving, outside, or moving.

12. The eyewear device of claim 1, wherein the at least one sensor comprises a global positioning system configured to determine location and wherein the content identifier is further configured to determine supplementary information for the selected image associated with the identified location.

13. A method comprising:
    storing a plurality of themes in a memory, each theme having a plurality of related images with each of the images associated with a respective contextual state, a first of the plurality of themes having a first image associated with a first respective contextual state in the memory and a second image associated with a second respective contextual state in the memory that is different than the first image;
    sensing one or more physical characteristics with at least one sensor of an eyewear device;
    identifying at least one of objects or aspects with a feature model of the eyewear device responsive to the one or more physical characteristics sensed by the at least one sensor;
    processing, by a feature analyzer of the eyewear device, the at least one of objects or aspects identified by the feature model by weighting the at least one of objects or aspects based on gaze direction of a user of the eyewear device;
    determining the contextual state in which the eyewear device is currently operating with a state selector responsive to the weighting based on gaze direction of the at least one of objects or aspects from the feature analyzer;
    selecting content for presentation on an optical assembly of the eyewear device responsive to a theme selection by the user and the contextual state in which the eyewear device is currently operating as determined by the state selector, the selected content including a current image, the current image including, when the theme selection is the first of the plurality of themes, the first image retrieved from the plurality of related images in the memory when the first contextual state is determined and the second image retrieved from the plurality of related images in the memory when the second contextual state is determined; and
    presenting overlay images based on the current image on the optical assembly of the eyewear device over a scene in a viewing area of the eyewear device.

14. The method of claim 13, wherein the optical assembly comprises a camera and a display and wherein the method further comprises capturing an image of the scene with the camera and displaying the captured image and at least one overlay image based on the current image on the display.

15. The method of claim 13, further comprising:
    monitoring a parameter of the eyewear device;
    determining when the monitored parameter crosses a threshold; and
    selecting an override image from the plurality of related images responsive to the monitored parameter crossing the threshold.

16. The method of claim 13, wherein the contextual state of the eyewear device includes one of a plurality of contextual states selected from a group consisting of: dining, evening, shopping, driving, outside, or moving.

17. The method of claim 13, further comprising:
    generating the at least one overlay image for presentation on the optical assembly from the current image.

18. The method of claim 13, further comprising:
    identifying a physical feature in a field of view of the optical assembly;
    registering the current image to the physical feature; and
    generating the at least one overlay image adjacent to the physical feature to which the current image is registered.

19. The method of claim 13, further comprising:
    determining a location of the eyewear device; and
    determining supplementary information for the selected image associated with the determined location.

20. A non-transitory computer-readable medium storing program code which, when executed, is operative to cause an electronic processor of an eyewear device to perform the steps of:
    storing a plurality of themes in a memory, each theme having a plurality of related images with each of the images associated with a respective contextual state, a first of the plurality of themes having a first image associated with a first respective contextual state in the memory and a second image associated with a second respective contextual state in the memory that is different than the first image;
    sensing one or more physical characteristics with at least one sensor of the eyewear device;
    identifying at least one of objects or aspects with a feature model of the eyewear device responsive to the one or more physical characteristics sensed by the at least one sensor;
    processing, by a feature analyzer of the eyewear device, the at least one of objects or aspects identified by the feature model by weighting the at least one of objects or aspects based on gaze direction of a user of the eyewear device;
    determining the contextual state in which the eyewear device is currently operating with a state selector responsive to the weighting based on gaze direction of the at least one of objects or aspects from the feature analyzer;
    selecting content for presentation on an optical assembly of the eyewear device responsive to a theme selection by the user and the contextual state in which the eyewear device is currently operating as determined by the state selector, the selected content including a current image, when the theme selection is the first of the plurality of themes, the first image retrieved from the plurality of related images in the memory when the first contextual state is determined and the second image retrieved from the plurality of related images in the memory when the second contextual state is determined; and
    presenting overlay images based on the current image on the optical assembly of the eyewear device over a scene in a viewing area of the eyewear device.

* * * * *